March 3, 1942. E. E. METCALF 2,275,392
GRAIN THRESHING AND SEPARATING MACHINE
Filed Oct. 30, 1939 5 Sheets-Sheet 2
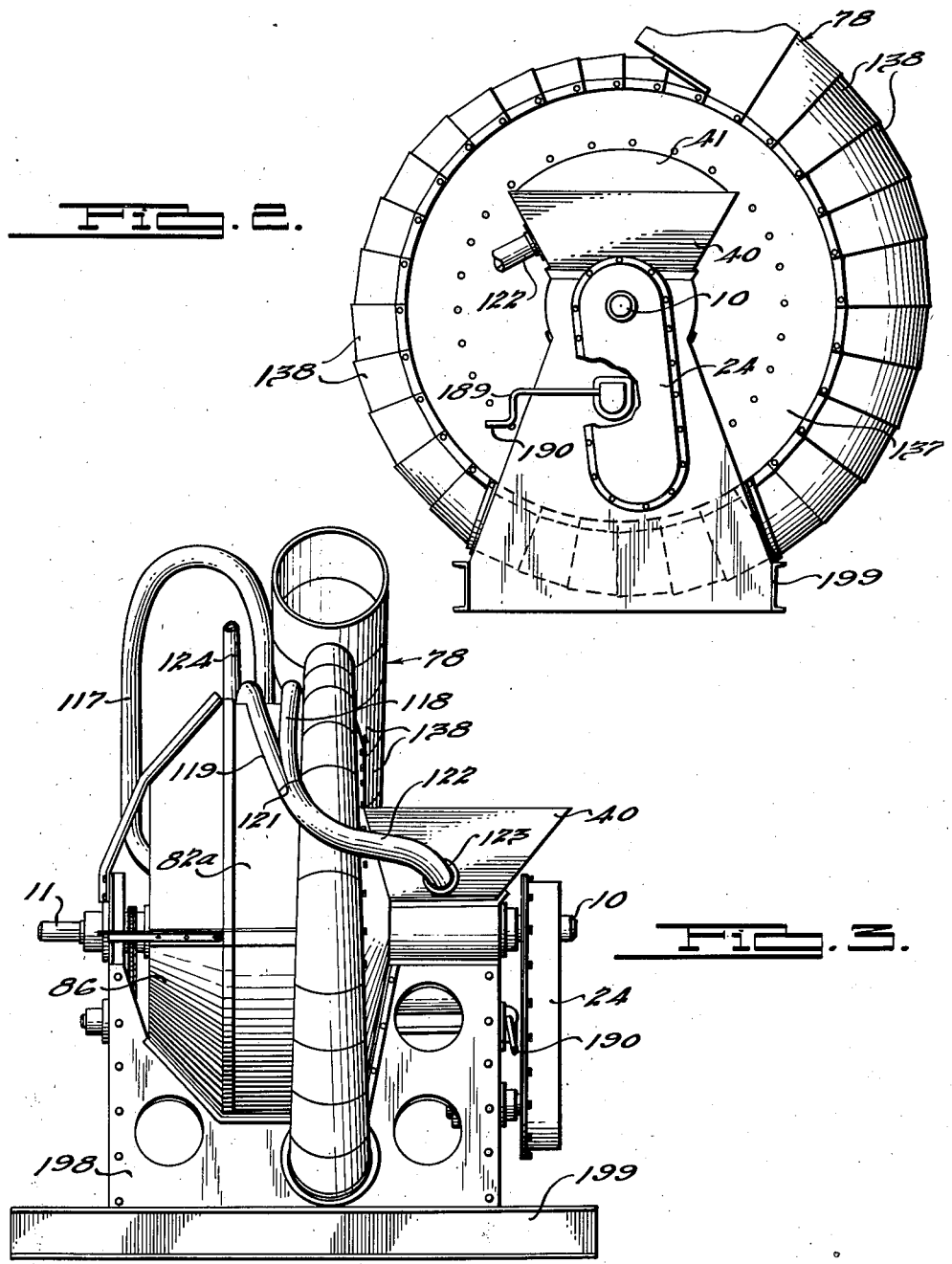
INVENTOR
Edgar E. Metcalf
BY
Harness, Dickey & Pierce
ATTORNEYS

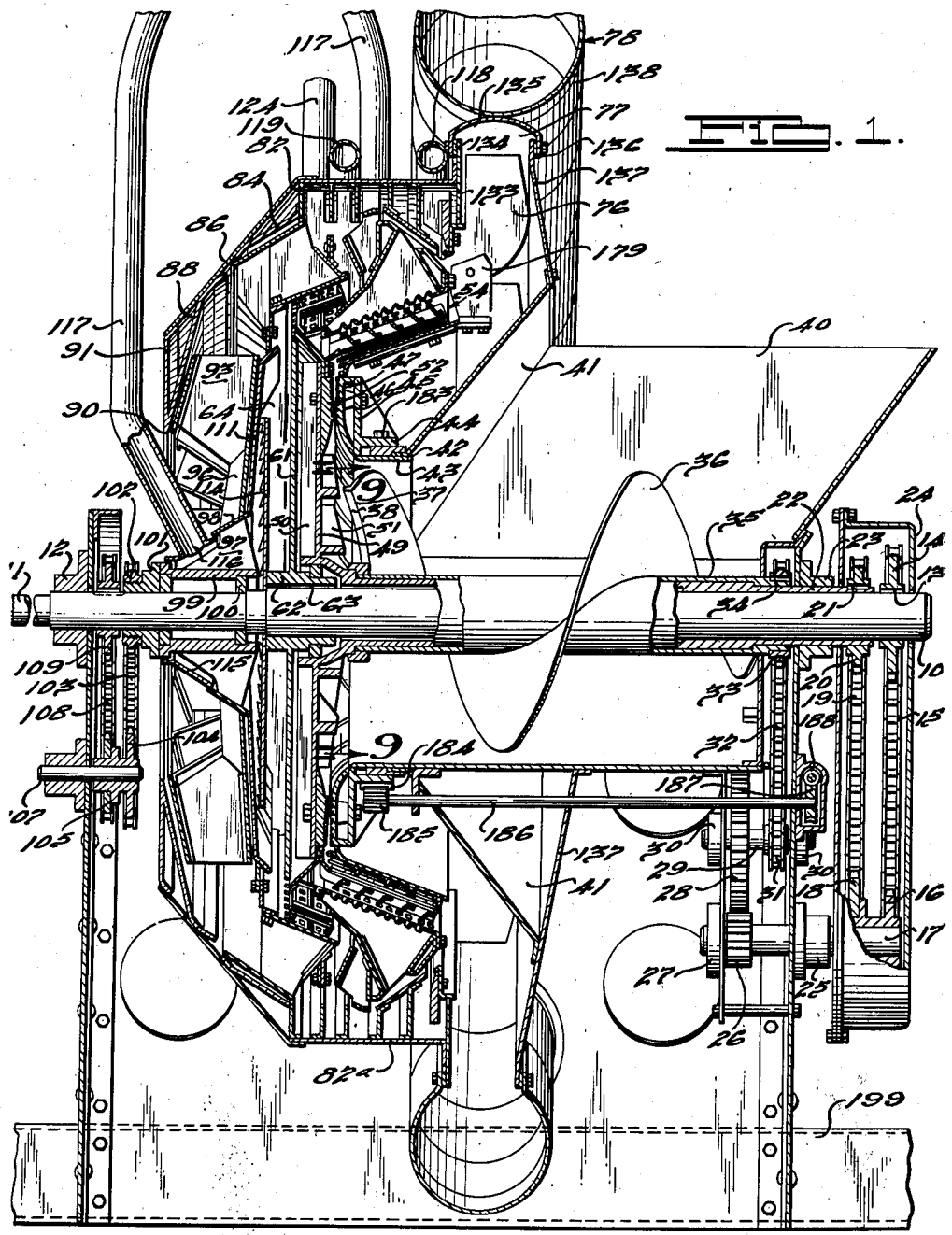

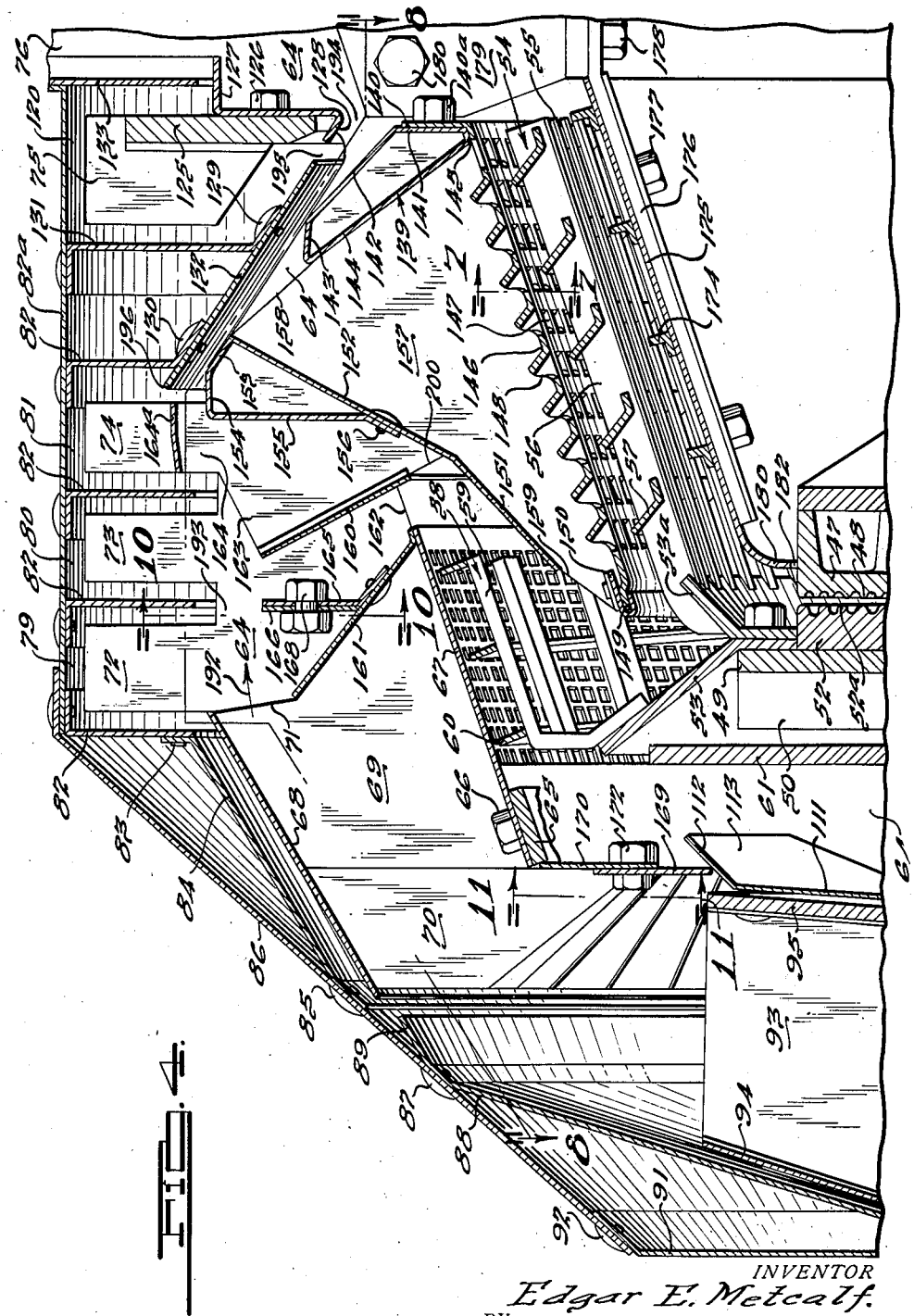

March 3, 1942. E. E. METCALF 2,275,392
GRAIN THRESHING AND SEPARATING MACHINE
Filed Oct. 30, 1939 5 Sheets-Sheet 4

INVENTOR
Edgar E. Metcalf.
BY Harness, Dickey & Pierce.
ATTORNEYS.

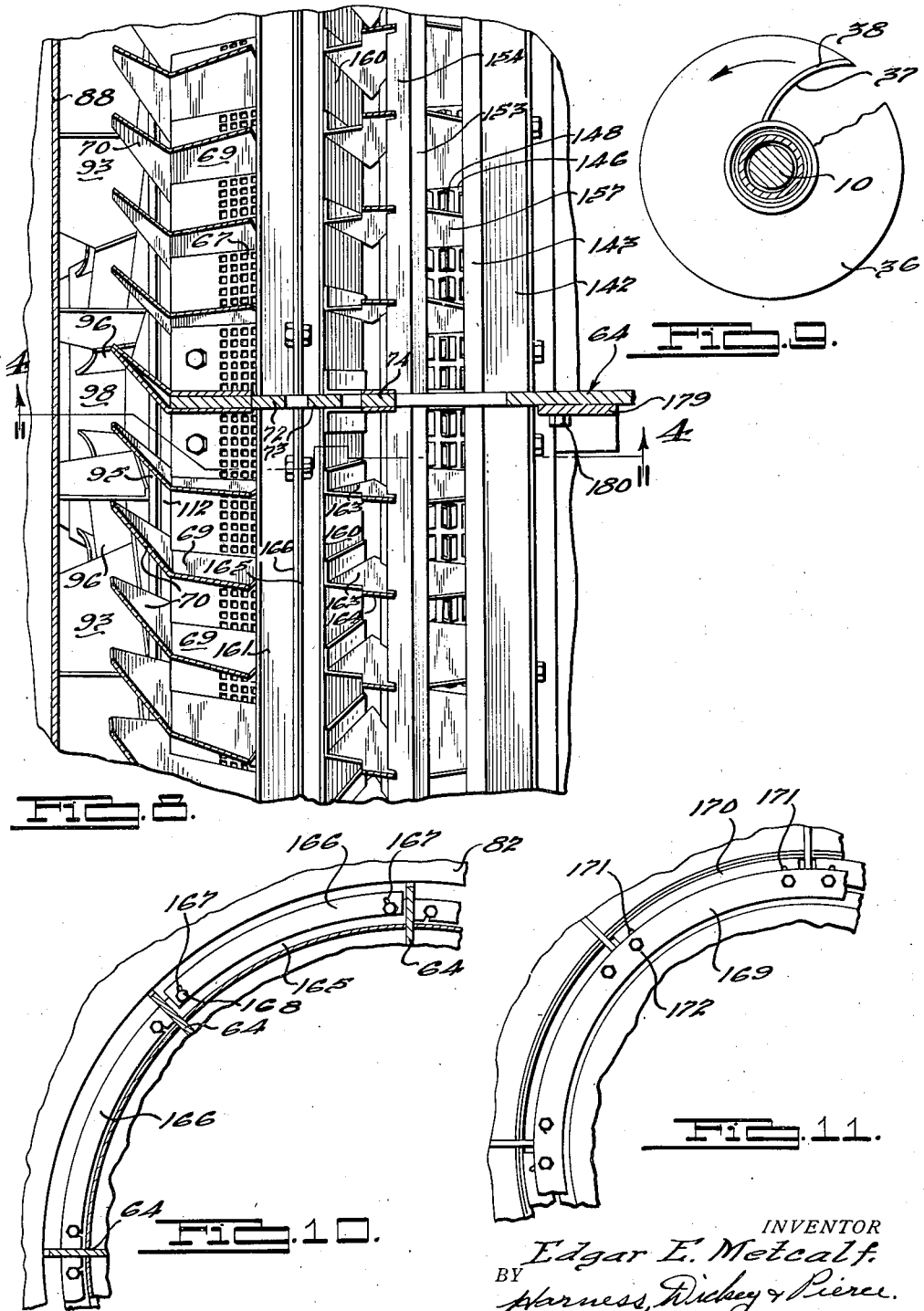

Patented Mar. 3, 1942

2,275,392

UNITED STATES PATENT OFFICE 2,275,392

GRAIN THRESHING AND SEPARATING MACHINE

Edgar E. Metcalf, Moville, Iowa, assignor of one-half to Detroit Harvester Company, Detroit, Mich., a corporation of Michigan Application October 30, 1939, Serial No. 301,962

24 Claims. (Cl. 130—27)

The present invention relates to grain threshing and separating machines and constitutes an improvement over the machine disclosed in my Patent No. 2,069,735, dated February 2, 1937.

It has been found necessary to effectively separate threshed grain from chaff and other foreign material to utilize a combination of winnowing and screening operations and all threshing machines now in use utilize both of these principles for separating the grain. However, the capacity of the separating mechanism is relatively limited by reason of the fact that in the machines now in use, the force of gravity is relied upon in combination with the air blast for the winnowing operation and also for the purpose of forcing the grain through the screens. As a result, it has not been possible to increase the amount of material passing through the screen or to increase the air blast beyond well defined limits. In applicant's above mentioned prior patent is disclosed a machine in which centrifugal force is utilized rather than the force of gravity in conjunction with both the screening and winnowing operations, with the result that the capacity of the machine for a given size may be greatly increased. In the machine of the aforesaid prior patent, the cut grain is fed axially to the center of a rotary threshing and separating mechanism which throws the grain outwardly and successfully threshes, screens, and winnows the same to separate the grain from the chaff and other foreign material.

It is a general object of the present invention to provide an improved machine of the type mentioned which has a greater capacity than the former machine, due to the fact that the threshing and certain of the screening elements operate at higher speeds and which also more effectively and completely separates the grain from the chaff.

Another object of the present invention is to provide means to prevent cracking of the grain kernels as a result of high speed impact with portions of the machine.

Another object of the invention is to provide in a machine of the above character an integral re-cleaning system for the separated grain.

Another object of the invention is to provide an improved form of centrifugal screening mechanism comprising a pair of concentric rotary screens operating at different speeds in the same direction.

Another object of the invention is to provide an improved form of centrifugal winnowing mechanism comprising a conical plate through which the air blast is conducted in a direction toward the apex of the cone, in combination with means for rotating the air and sweeping the material to be winnowed at a constant rate of speed around the interior of the conical surface in order to accurately balance by centrifugal force the force induced by axial component of the air blast.

Another object is to provide means for directing the air blast in the above mentioned winnowing operation in a direction substantially parallel to the walls of the conical separating surface.

Another object of the invention is to provide means for controlling the speed and direction of the air blast utilized in the winnowing operation.

A further object is to provide a multi-stage separating mechanism in order to distribute the separating load and thereby prevent clogging or interference to the end that separation will be effected with greater speed and efficiency.

Other objects and advantages of the invention will become apparent from the following specification, the accompanying drawings, and appended claims.

In the drawings:

Figure 1 is a sectional view taken substantially along the central axis of the machine;

Figure 2 is an end elevation, part of the same being broken away;

Figure 3 is a side elevation;

Figure 4 is an enlarged section of the separating mechanism, together with portions of the recleaning device as shown in Fig. 1. It is taken on line 4—4 of Fig. 8;

Figure 8 is a sectional view taken on the line 8—8 of Figure 4;

Figure 9 is a sectional view taken on the line 9—9 of Figure 1 showing the end portion of the conveying screw;

Figure 10 is a fragmentary section on line 10—10 of Figure 4 showing one of the air regulating units;

Figure 11 is a fragmentary section on line 11—11 of Figure 4 showing a further air regulating unit.

Figure 5:
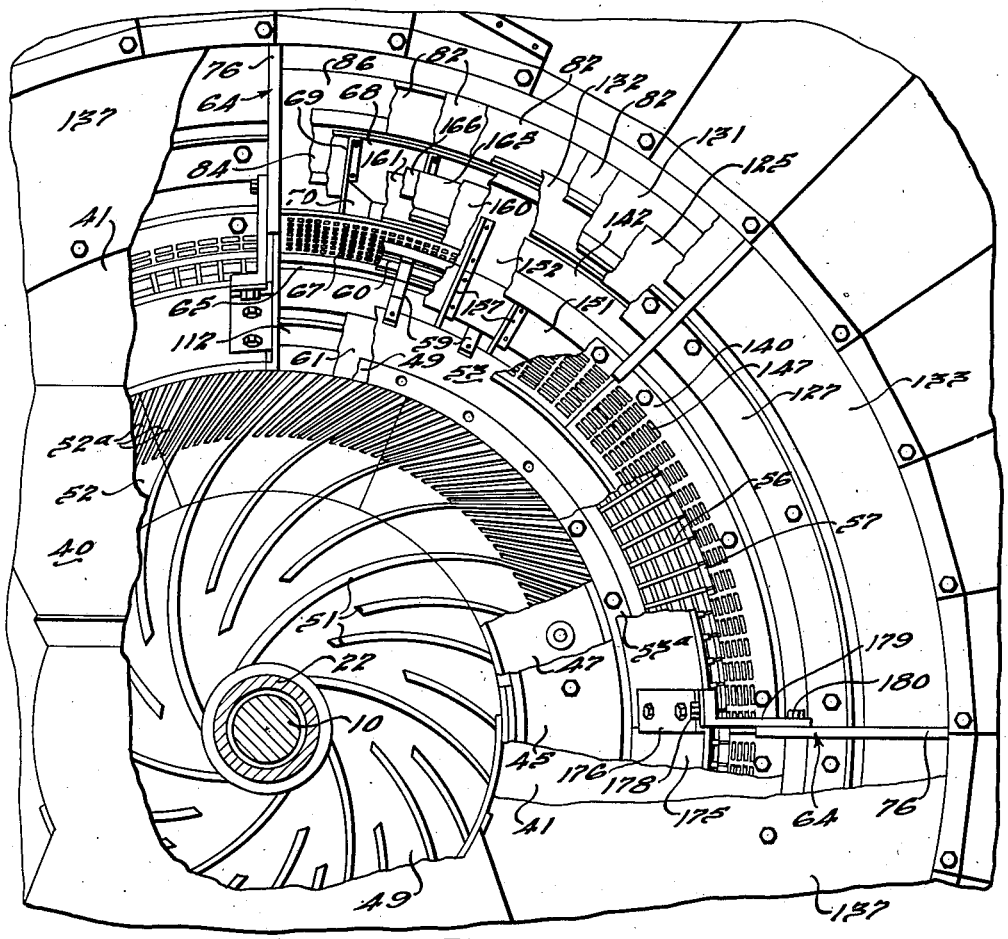
Figure 5 is an enlarged view similar to Fig. 2, but of only a portion of the machine with parts broken away to show the interior construction.

The machine is provided with a main driving shaft 10 which is suitably driven by means of a pulley or other means attached to the extending portion 11. The shaft 10 is journaled in the bearing 12, and extends through the entire machine. At its opposite end it is attached by a key 13 to a sprocket 14 over which passes the chain 15, which in turn engages a sprocket 16 carried by a shaft 17. A sprocket 18 on shaft 17 is connected by a chain 19 to a sprocket 20 which is attached by a key 21 to an outer hollow shaft 22 which surrounds and is independently rotatable with respect to the shaft 10. The hollow shaft 22 is journaled within the bearing 23. A housing 24 encloses the sprockets 14, 16, 18, and 20.

The shaft 17 passes through a bearing 25 and attached to this shaft is a small gear 26, the inner end of shaft 17 being journaled at 27. The gear 26 meshes with a larger gear 28 which is attached to a shaft 29 which shaft is journaled in bearings 30. A sprocket 31 on shaft 29 is connected by a chain 32 to a sprocket 33 which is attached by a key 34 to a further hollow shaft 35 that surrounds hollow shaft 22. Attached to the outer shaft 35 is an auger conveyor 36 which terminates at 37 in wiping flange 38. Wiping flange 38 extends substantially radially but curves slightly as shown in Figure 9.

Enclosing the spiral conveyor 36 is the hopper 40 which is fed in any suitable manner not shown, as by a traveling belt of a combine. A frusto-conical member 41 is attached to the hopper 40 and at 42 to a cylindrical member 43. A ring member 44 having an integral radial flange 45 is secured to member 43 and carries at 46 a stationary threshing plate 47 provided with a series of rubbing ribs 48. Fixedly mounted on shaft 22 is an annular distributing plate 49 having a series of radial stiffening ribs 50 on its rear surface. Plate 49 is provided with a plurality of spaced substantially arcuate raised ribs 51 (see Fig. 5) which extend from a point centrally thereof outwardly in a clockwise spiral for the purpose of feeding straw and grain outwardly to the plate 47. Attached to the plate 49 is an annular threshing member 52 which includes the series of ribs 52a (see Fig. 5) which are spaced from and opposed to the similar ribs 48 on the stationary plates 47. The ribs 48 and 52a extend spirally in opposite directions.

A pair of frusto-conical ring members 53 and 53a are attached to the other periphery of the plate 49. The ring 53a carries a frusto-conical screen member indicated generally at 54 and having openings 55 therein. The screen is formed by a plurality of longitudinal members 56 which are secured at their inner ends to ring 53a and which are connected to each other by a conveying member 57 which extends helically entirely around the frusto-conical screen five times to complete the screen and for another purpose hereinafter mentioned. Secured to ring 53 is a frusto-conical grated structure indicated generally at 58. The grating 58 is formed by a plurality of substantially axially extending bars 59 and a helically pitched conveying member or rib 60 which is attached to the bars 59. It will be noted from this structure that the screens 54 and grating 58 will rotate at the same speed as the plate 49. The helical rib 60, as hereinafter explained, cooperates with a re-cleaning screen.

Figure 6:
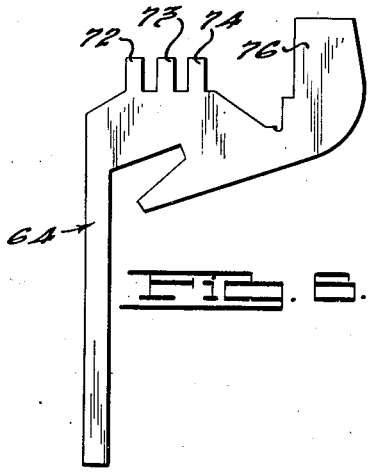
Figure 6 is a longitudinal view of one of the main impelling blades, removed from the machine.
Figure 7:
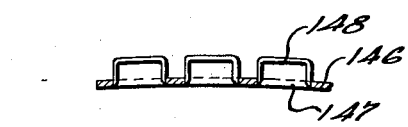
Figure 7 is a fragmentary sectional view of one of the separating screens taken on the line 7—7 of Figure 4.

A circular plate 61 having a hub 62 keyed at 63 to the drive shaft 10, carries the greater portion of the separating elements of the machine. On the rear of the plate 61 are a series of radially extending blades or webs 64 which extend beyond the limits of the plate 61 and are of the form shown best in Fig. 6. Secured to blades 64 is a circular ring 65 preferably formed as a series of segments extending between each pair of blades 64. To ring 65 is attached at 66 a frusto-conical re-cleaning screen 67. Spaced outwardly from the screen 67 is a further frusto-conical member 68 forming with screen 67 a closed annular passageway. Extending radially between members 67 and 68 are a plurality of vanes 69 (see Fig. 8) each having at its rear edge a blade 70 which is bent at a substantial angle in a direction opposite to the direction of rotation of plate 61. There are only a comparatively small number of blades 64 compared to the number of vanes 69 but the blades 64 continue through the same and extend into successive paddle portions 72, 73, and 74, and into the large paddles 76. A further series of paddles 75 are also carried by these blades 64 as hereinafter set forth.

The paddles 76 rotate within the open annular space 77 which communicates with a spiral straw or chaff pipe 78 which surrounds the periphery of the machine as shown. The paddles 72, 73 and 74 rotate within successive channels 79, 80, and 81 which are built up to annular partitions 82 secured to the cylindrical outer casing 82a. One of the annular partitions 82 is attached at 83 to a further frusto-conical member 84 which is attached at 85 to an outer shell member 86. Attached at 87 to the shell 86 is a further wind directing plate 88 which includes the inwardly extending beveled portion 89 and the member 88 terminates at 90 at the inner edge of a vertical shell ring 91 which is attached at 92 to the member 86.

Positioned forwardly of plate 88 is a blower or fan comprising a series of radial fan blades 93 which are between plates 94 and 95. Spoke members 96 connect blades 93 to an inner series of substantially triangular shaped fan blades 97 which extend between a frusto-conical member 98 and the hub 99. The hub 99 is freely journaled at 100 to suitable bearings upon the shaft 10 so that it can turn freely at a much higher speed than the shaft. A collar 101 which is attached to hub 99 carries a sprocket 102 over which passes a drive chain 103 which is driven by means of a further sprocket 104 on a shaft 107. A second chain 108 connects a second sprocket 105 on shaft 107 to a sprocket 109 keyed to shaft 10. The ratio between the sprockets 109 and 105 provides a greater speed to the sprocket 105 and this speed is in turn increased by means of the ratio between the sprockets 104 and 102 so that the resultant speed of the fan 93 is substantially four times that of shaft 10.

Attached at its outer edge to the spokes 64 is a plate 111 which forms the forward wall of the casing for fan 93. Plate 111 has an outer flange portion 112 to which is attached a series of radial blades 113 that are also secured to the plate itself. The inner edge of plate 111 terminates outwardly of the forward edge of frusto-conical member 98.

A disk 114 is attached to the spokes 64 inwardly of plate 111 and extends inwardly to hub 62 forming an open passage leading from the interior of member 98 to the blades 113. A stationary cone member 115 surrounds hub 99 and communicates at its large end with the interior of member 98 and through an opening 116 with the tubular pipe 117. Pipe 117 supports cone 115 and connects it with the channel 81 in the main casing. Further pipes 118 and 119 are connected to the channels 120 and 80 respectively and merge together at 121 (see Fig. 3) into the larger pipe 122 which passes into the hopper 40 at 123. A grain exit pipe 124 is suitably connected to the channel 79 and passes to a suitable grain receiving bin, not shown.

Paddles 75 in channel 120 are carried by an annular ring 125 which is attached at 126 to a member 127 which in turn is suitably carried by paddles 76. Member 127 merges into a rearwardly directed frusto-conical flange 128. Attached at 129 and 130, respectively, to the partition 82 and a similar portion 131 is a frusto-conical separating plate 132 whose surface is positioned at a substantial angle to its horizontal axis and terminates just short of flange 128.

The housing around paddles 76 is completed by an annular element 133 which is attached at 134 to the closure plate 135 which in turn is attached at 136 to the outer end plate 137. As explained heretofore, the chaff pipe 78 communicates directly with the peripheral channel 77, and the pipe 78 can be built up of a number of segments 138 (see Fig. 2) which gradually increase in size toward the outer limits of the pipe, and which form the bottom or closure member of the channel 77.

A hollow annular member 139 carried by the extension of blades 64 is positioned just inwardly of the smaller end of the separating cone 132. Member 139 includes a radial wall 141, an angular portion 142 extending outwardly from wall 141 and merging with a cylindrical portion 143 which in turn bends into the inwardly inclined portion 144 and terminates at 145 to form a hollow annular structure. Member 139 is preferably formed as a plurality of segments extending between the adjacent blades 64. A flange 140 on a frusto-conical screen member 146 is secured to the hollow member 139 by bolts 140a. The screen 146 is substantially parallel to and surrounds the screen 54. The openings 147 in screen 146 are formed by a punching operation which leaves adjacent each opening an outwardly inclined projection 148, and these openings are spaced throughout the entire peripheral surface of the screen. The inner end of screen 146 is attached at 149 to a ring 150.

A frusto-conical plate 151 which merges into a steeper conical portion 152 is positioned rearwardly of hollow member 139 and extends outwardly and forwardly from the inner edge of screen 146. The outer edge of plate portion 152 is bent into an annular hollow structure defined by walls 153, 154, and 155, the latter being attached at 156 to the plate 152. Plate 151 is also preferably formed in segments extending between blades 64. The walls 153 and 154 are adapted to form with separating cone 132 a restricted throat or nozzle as hereinafter set forth. A plurality of flat radially positioned thin sheets or blades 157 of which there are a comparatively great number spaced peripherally about the screen 146, plates 151 and 152 and member 139 thereby forming a series of cells or passages adapted to discharge screened material at 158 onto the separating cone 132. An opening into these cells or passages is provided at 159 through which air from fans 93 and 97 is blown through screen 146 in a direction to oppose passage of chaff and other light material therethrough.

At the outer edge of screen 67 are a pair of spaced diverging frusto-conical plates 160 and 161 which extend around the axis of the machine and are connected to the extensions of blades 64. Plate 161 is also connected to the forward edges of blades 69. At their inner edges plates 160 and 161 are spaced to provide an entrance 162 for material discharged from the outer edge of screen 67. As shown in Figs. 4 and 10, extending between blades 64 and secured to plate 161 is an annular ring 165 to which a plurality of segmental plates 166 are adjustably attached by bolts 168 which pass through suitable slots 167 in plates 166. Each of the plates 166 extends between adjacent blades 64 and adjustment of these plates radially controls the flow of air from the fan to the separating cone 132. Extending from plate 160 to wall 155 are a plurality of radial blades 163 which are similar in arrangement to the blades 157. The outer ends of blades 163 have projections 164 adjacent the outer end of the separating cone, and an annular substantially cylindrical ring 164a is attached to the outer ends of these projections and cooperates with wall 154 in forming the restricted throat or nozzle leading to the separating cone.

Means are also provided for controlling the flow of air to screen 67 which means, as shown in Figs. 4 and 11, comprises an annular member 169 secured to blades 64 and attached to a plurality of segmental plates 170 by means of bolts 172. The bolts pass through slots 171 in plates 170 to permit radial adjustment of the latter for the purpose of controlling or eliminating the flow of air from fan 93 over the inner surface of screen 67.

Means are provided for positively controlling the rate of movement of material axially over the three screens 54, 67 and 146, to prevent clogging or sliding and blowing of the material off the screens by the air blast before the grain has an opportunity to pass through the screen openings. This means, in the case of screen 146 comprises the helical bar 57 of screen 54 which bar projects outwardly beyond the longitudinal bars 56 and lies in close proximity to the surface of screen 146. While both screens 54 and 146 are rotated in the same direction screen 54 being attached to plate 49 is rotated at a higher speed than screen 146 which is attached to plate 61. Accordingly, the helical bar 57 insures that the material will move toward the large end of screen 146 at a uniform rate of speed. The corresponding means in the case of screen 67 is the helical bar 60 which operates in close proximity to screen 67 in the same manner and for the same purpose.

The control of movement of material over screen 54 is similarly effected by a helical bar 174 which is mounted on the exterior of a frusto-conical member 175 attached to longitudinal bars 176 by bolts 177. The bars 176 are secured by bolts 178 to brackets 179, which in turn are secured by bolts 180 to the blades 64 inwardly of paddles 76. In this case the helical bar 174 rotates at a slower speed than screen 54 and accordingly the spiral is of opposite hand to the spirals 57 and 60 previously described. The screens 54, 67, and 146 are preferably frusto-conical in form, as shown, in order that centrifugal force will move or assist the feeding ribs in moving material over their inner surfaces.

As will be readily understood the openings in screen 54 are larger than those in screen 146, which latter openings are larger than those in screen 67. The openings in screen 67 are only of sufficient size to permit free passage of the grain while the larger openings in screens 54 and 146 are so proportioned as to divide the preliminary separating function between the two screens.

The inner end of the member 175 curves in an arcuate formation as at 180, leaving a slight space 182 between the same and the outer limits of the plate 47. The bolts 183 pass through arcuate pitched slots which are provided in the member 44, and attached to the member 44 is the arcuate gear rack 184 which meshes with the small gear 185. The gear 185 is attached to the shaft 186 which is attached to the worm wheel 187 which meshes with the worm 188, and attached to the worm 188 in the crank 189 (see Fig. 2) having the handle 190. As a result of this mechanism the space between the threshing elements 47 and 52 can be adjusted at any time by rotating handle 190 to accommodate different types of grain or grain which is more or less wet.

In considering the operation of the machine, it will be observed that the shaft 10 which is driven through a suitable connection at the portion 11 provides the driving action for all of the rotating parts. The shaft 10 may rotate, for example, at approximately 400 R. P. M. The intermediate hollow shaft 22 then rotates at approximately 710 R. P. M. due to the relative diameter of the sprockets 14, 16, 18 and 20. The outer hollow shaft 35 then rotates at approximately 140 R. P. M. and in a reversed direction through the reduced speed arrangement of the gears 26 and 28 and sprockets 31 and 33.

In considering the lefthand side of the machine in Fig. 1 it will be observed that the fan, which includes the fan blades 93, rotates freely upon the hub 99 which is journaled upon the bearings 100. The speed of the fan is approximately 1500 R. P. M., which speed is set up through the engagement of the chains 103 and 108 with the sprockets 109, 106, 104 and 102, the relative diameters and arrangements of which increase the speed of the fan to nearly four times that of the shaft 10. Due to these driving connections the auger 36 which is attached to the shaft 35 turns in one direction and the shaft 22 and also the shaft 10 revolves in the opposite direction to the auger. The fan also rotates in the same direction as the shaft 10 and the shaft 22, but in the opposite direction to the auger. In other words, the entire system of rotating parts rotate oppositely to the direction of the auger 36 at varying speeds.

The unthreshed bundles of cut grain or such material is conveyed up to the hopper 40 by any suitable elevator such as is provided in combines and the like and is deposited therein. The auger 36 carries the material toward the left as shown in Fig. 1 against the spiral distributing ribs 51. Upon examination of Fig. 2, in considering that the shafts 10 and 22 revolve from right to left and the auger from left to right, it will be observed that the ribs 51 rotate at a speed of approximately 710 R. P. M. and oppositely to the flange 38 which is an integral continuation of the auger 36. The effect is to provide an equal and uniform distribution of the unthreshed material about the distributing plate 49 and to also assist in impelling the material centrifugally outwardly. The centrifugal impulsion of the material, however, is principally caused by the rapid rotation of the plate which brings the unthreshed material between the ribs 52a and the stationary ribs 48. The rubbing action provided between the ribs 52a and 48 removes or loosens the solid grain particles from the straw and chaff due to the scouring action. The material then leaves the outer periphery of these plates in a uniform thin layer.

As the grain which is now loosened travels outwardly due to centrifugal action thereof, it passes outwardly into the space between the conical plate 175 and the screen 54. The straw will then move outwardly along the inner surface of screen 54, under the control of the helical member 74, until it is engaged by paddles 76 and thrown into the straw pipe 78, and thence out through the opening 191.

Grain passing between the threshing plates, if not traveling at the same speed as the bars 56 of screen 54, will bounce back to the member 175 and the centrifugal action imparted due to the rotation of the member 176 will impel the grain back through the openings 55 and between the bars 56.

In considering further the operation of the machine, it must be remembered and specifically noted that the centrifugal effect increases in direct proportion to the distance of the outwardly impelled material from the central axis. Also, the centrifugal effect is considerably increased by virtue of the speed of the impelling members. As a result, the grain is centrifugally impelled through the screen 54 and will then pass through the openings 147 in screen 146. It will be noted that since frusto-conical member 175, the screen 146, the cell structure 157, the paddles 76, 75, 74, 73, 72 and the wind channels 69 are all connected to the plate 61 this entire structure will rotate at the same speed as shaft 10, or 400 R. P. M. Since the screen 54 rotates at 710 R. P. M., which is at a greater speed than the member 146, the result will be that the helically pitched members 57 will also control movement of material outwardly along the inner surface of screen 146 toward the straw pipe.

The grain particles and some chaff which passes through both screens 54 and 146 are delivered into the cells or passageways defined by the blades 157, which insure uniform delivery of material peripherally through the openings 158 and onto the stationary separating cone 132. The material which is delivered onto the cone 132 is substantially free from straws and larger particles.

At this point a further and important separating action takes place, which will now be described. The fan blades 93, which are rotating at a high velocity of substantially 1500 R. P. M. are rotating in the same direction as the entire cellular structure heretofore described which rotates at the speed of 400 R. P. M. Fig. 8 illustrates more clearly the method by which the centrifugally impelled air enters into the wind channels 69. In considering Fig. 8, the blades 93 are traveling from left to right, as well as the channels 69. Since the blades 93 are traveling at a much higher speed, the wind which is blown through the channels 69 strikes against the bent portions at 70 and is thus impelled at a certain velocity through the opening 71 and in an axial direction. This rapidly moving current of air then travels in the direction of the arrows 192 through the opening 193, which can be adjusted in size by means of the adjustable arcuate segments 166, and then travels forwardly through the restricted throat or nozzle defined by ring 164a and walls 154 and 153 against the outer end of the separating cone 132. This high velocity air blast then travels axially and inwardly on the inner surface of the cone 132 where it encounters the solid grain particles as well as chaff which may have passed through the screen openings 55 and 147.

Since the chaff and tailings are lighter than the grain, the blast of air will drive the same axially and inwardly along the cone 132 and out through the opening 194 where it will be taken up by the paddles 76, and will be thrown out through the chaff or straw pipe 78. Light kernels and unthreshed heads which are too heavy to drift out with the wind through the opening 194 will pass outwardly through the annular opening 195 and into the channel 120 where they will be exhausted into the pipe 118 and conveyed through pipe 122 to the hopper 40 from whence it is passed through the entire process again. The solid grain particles, which by this time will be impelled at a considerable centrifugal speed outwardly, will gradually drift, or will be forced over the outer edge 196 of the cone 132 into the collecting channel 81. Channel 81 is connected to pipe 117.

It should be noted that the centrifugal winnowing separation which takes place on cone 132 is effected by a careful balance between the axially directed air blast and centrifugal force in order to accomplish a separation of the material in accordance with the density of the constituent particles. The force exerted by the air blast on any particle is a function of its size and shape whereas the centrifugal force for a given speed of rotation is a function of the mass of the particle. Centrifugal force tends to cause movement of the particles toward the outer edge 196 of cone 132 whereas the air blast tends to move particles toward the inner edge of the cone. Accordingly, for any given speed of rotation and air blast the direction in which a particle will move depends upon its density and surface area. If its size or surface is great as compared with its mass, the effect of the air blast will prevail and the particle will move inwardly on the cone, whereas if its size and surface is small as compared with its mass (high density) centrifugal force will prevail over the air blast and the particle will move outwardly. The grain is not only relatively dense, but has a very regular shape of small area so that it is little affected by the air blast. The mechanism will effect a separation of particles of the same size and shape but of different densities and will also separate particles of the same density if they so differ in shape as to have different resistances to the air blast, since both density and the shape of a particle affect the forces acting on it. However, for sake of simplicity the separation is referred to herein and in the appended claims as taking place between denser and lighter particles, it being understood that the controlling factor is the ratio of density to the wind resistance or "sailing qualities" of the particle. For proper performance it is essential that the balance between centrifugal force and the air blast be maintained at a constant value so that, theoretically at least, particles of some size, shape and density intermediate the grain on the one hand, and chaff and unthreshed heads on the other, will remain stationary on the separating cone. Prior attempts to effect a winnowing operation by projecting material onto a conical plate have failed due to fluctuations in the speed of rotation of the material as a whole and variations in speed on different portions of the cone with a consequent fluctuation and variation in the centrifugal force and destruction of the required balance. However, in accordance with the present invention, the speed of rotation of material on the inner surface of the separating cone 132 is maintained at a constant value over the entire surface by reason of the fact that the discharge opening 158 of the cells between blades 157 is immediately adjacent the surface of the cone 132 with the result that when deposited on the cone the material is rotating at exactly the speed of plate 61. Moreover, by reason of blades 64, 70, 69, 163, 164 and 157, the axially directed air blast is also rotated at the same speed as plate 61, thus the air blast itself has a component or rotation which maintains all the material on the plate 132 at the desired speed of rotation at all times. In this connection note that the outer edges of blades 157 and particularly blades 64 lie in close proximity to the surface of cone 132 and hence sweep over that surface and insure maintenance of the desired rotary movement of the air in contact with the cone. As a result the separation is effected by a proper balance between the rotary and axial components of motion of the air blast and a positive maintenance of these components at a constant value over the entire surface of the cone. The cone, among other things, serves to retard outward movement of the material until proper separation can take place.

It would be possible to connect the separating cone 132 to the blades 64 and 157, so that it too rotates, but it is preferred to have the cone stationary as shown so that the particles to be separated tend to roll and are slightly agitated, since that action materially assists in the separation.

Another important contribution to the success of the separation performed on cone 132 is the fact that the great bulk of the straw and other waste material has been removed by screens 54 and 146 before the material reaches the cone. Consequently, there is no danger of the cone becoming clogged during operation. On the contrary, the material is spread evenly on the cone surface in a very thin layer with the result that a rapid and efficient separation can take place.

The grain delivered to pipe 117 from the separating cone is practically free of chaff and loose particles, but may contain a certain amount of heavy refuse and pieces of heads. This grain which passes downwardly through the pipe 117 enters the re-cleaning device at 116 where it is centrifugally impelled and distributed by means of the blades 97, which rotate with the fan blades 93. The grain is impelled outwardly between the member 111 and the disk 114 and is then thrown radially at high speed off the tapered member 112 by blades 113. The arcuate segments 170 can be adjusted to regulate the intake of air at this point. Due to the centrifugal action, the grain will pass outwardly and between the frusto-conical screen 67 and the member 58.

It will be noted that the member 58 is attached to the rotating portion 53 which in turn is attached to the distributing plate 49 which rotates at approximately 710 R. P. M. while the screen 67 rotates at only 400 R. P. M. As a result, the relatively higher rotation of the inner member 58 will cause an augering effect to be imparted due to the helically pitched auger member 60. This, as previously described, controls or effects movement of particles of material toward the opening 162 where any material that fails to pass the screen will be thrown outwardly between the member 161 and the member 160, and will then be impelled outwardly into the channel 80. Since portions of this material might contain grain, it will then pass through the pipe 119 which is connected to the channel 80 and will join the material in the pipe 122 and will pass to the hopper 40 to repeat the entire process.

Practically all of the solid grain particles will be thrown out through the openings in the frusto-conical member 67 and will pass radially outwardly through the openings 71 between blades 69, and thence directly into the channel 79 to which the grain or delivery pipe 124 is attached. The grain passing to the pipe 124 is clean of all tailings, chaff, and sticks, etc., since the cleaning incline 132 as explained has removed all of the lighter material such as chaff and light sticks, etc., and has left only the heavier sticks to be removed by the re-cleaning screen 67. Moreover, if any small light material passes screen 67 it will be blown over channel 79 and into channel 80.

The members 170 permit adjustment of the volume of air permitted to flow through skeleton structure 58, and thence through the openings 159 and through the screen openings 147 and aids in the discharge of straw into the pipe 78. Air is also forced through the annular opening 200 to assist the action of the air passing through the opening 193 and following the direction indicated by the arrows 192. The segments 166 permit adjustment thereof for different types of grain and the like and regulate the blast of air being delivered from the fan to the cleaning cone 132. The cleaned grain in its final stages must necessarily pass into the annular channel 79 since, due to the high rotational speed, the centrifugal action is directed radially from the axis and the grain is thus confined to the opening at 71, and, due to the continued centrifugal action is thrown into the channel 79.

An important advantage of the machine flows from the use of an inner threshing and screening mechanism rotating at high speed in conjunction with an outer screening and separating mechanism operating at a lower speed. For compactness and low weight it is necessary to arrange successively operating portions of the mechanism in series extending outwardly from the center of the machine. However, for a given speed of rotation the inner portions move at less speed than the outer portions and, therefore, are subject to less centrifugal force. Moreover, the inner portions necessarily are of smaller area. As a result the inner portions are of relatively small capacity and, therefore, limit the capacity of the machine. If all of the rotating mechanism rotated as a unit and the rotor is speeded up to increase its capacity the outer portions will move at excessive speed, thus inducing high stresses and cracking of the grain particles by high velocity impact. These difficulties are overcome in the present machine by rotating the threshing mechanism and inner screen at a higher speed than the outer portions of the mechanism in order to compensate for the smaller size and lower areas of the inner portions.

The high capacity of the machine is due in part to the fact that the separating functions are divided between a plurality of stages arranged in series so that no stage is heavily loaded. This prevents clogging and interference with rapid separation.

The machine may be used as a stationary threshing machine but it is peculiarly adapted for use in a harvester-thresher combine or as a pickup thresher because of its small size and light weight compared with prior mahines of the same capacity and because it is not affected by uneven or sloping ground as in the case of threshers utilizing gravity for separation. The main body or casing of the machine, which is generally cylindrical in form, may be carried by side plates 198 which are secured to channels 199 that may form part of the combine frame.

The particular form of machine disclosed is to be considered merely as an example of one way of embodying the principles of the invention in a practical machine. The various details of construction shown may be varied without departing from the spirit of the invention or the scope of the appended claims.

What is claimed is:

1. In a grain separating mechanism a pair of spaced coaxial centrifugal screens, one mounted within the other, means to supply threshed material to the inner surface of the inner screen at one end thereof, means to rotate said screens at different speeds to force material therethrough by centrifugal force, a helical feeding rib movable with the outer screen and positioned in proximity to the inner surface of the inner screen for feeding material from said one end of said inner screen to the other, and a helical feeding rib movable with the inner screen and lying in proximity to the inner surface of the outer screen for moving material along said surface toward one end of said outer screen.

2. In a grain separating mechanism a pair of spaced coaxial truncated conical centrifugal screens, one mounted within the other, means to supply threshed material to the inner surface of the inner screen at the smaller end thereof, means to rotate said screens at different speeds to force material therethrough by centrifugal force and to cause movement of material on the inner surfaces of said screens towards the large ends thereof by centrifugal force, a helical feeding rib movable with the outer screen and positioned in proximity to the inner surface of the inner screen for controlling movement of material from said smaller end of said inner screen to the larger end, and a helical feeding rib movable with the inner screen and lying in proximity to the inner surface of the outer screen for controlling movement of material along said surface toward the larger end of said outer screen.

3. In a centrifugal grain separator, a pair of coaxial rotary members, means for rotating said members at different speeds, an annular screen mounted on one of said members, a second screen mounted on the other member and surrounding the first screen in order to receive screened material from the first screen and subject it to a further screening operation, a re-cleaning screen carried by said other member, means for conducting material which passes through said second screen to the inner surface of said re-cleaning screen, a helical feeding rib carried by said other member and lying in proximity to the inner surface of the first screen for controlling the movement of material toward one end of the latter, and a pair of helical feeding ribs carried by said one member, one of which lies in proximity to the inner surface of the second screen and the other of which lies in proximity to the inner surface of the re-cleaning screen to control movement of material toward one end of each of said screens, respectively.

4. In a centrifugal grain separator, a pair of coaxial rotary members, means for rotating said members at different speeds, an annular screen mounted on one of said members, a second screen mounted on the other member and surrounding the first screen in order to receive screened material from the first screen and subject it to a further screening operation, a re-cleaning screen carried by said other member, means for conducting material which passes through said second screen to the inner surface of said re-cleaning screen, a helical feeding rib carried by said other member and lying in proximity to the inner surface of the first screen for controlling the movement of material toward one end of the latter, a pair of helical feeding ribs carried by said one member, one of which lies in proximity to the inner surface of the second screen and the other of which lies in proximity to the inner surface of the re-cleaning screen to control movement of material toward one end of each of said screens, respectively, and means positioned in the path of movement of material from said second screen to said re-cleaning screen for subjecting said material to a centrifugal winnowing operation.

5. In a grain threshing and separating machine, a pair of axially spaced relatively rotatable annular threshing elements, means for feeding unthreshed material between the elements adjacent the center thereof, centrifugal separating means surrounding said elements and adapted to receive threshed material discharged centrifugally therefrom and to separate the said material, means for rotating said separating means, and means for rotating one of said threshing elements at a higher speed than the speed of rotation of said separating means to compensate for the difference in diameter of said threshing elements and said separating means.

6. In a grain separating device, a member having an internal surface conforming approximately to a truncated cone, means to direct a uniformly distributed air blast axially over said surface in a direction towards the small end of the cone, a rotary centrifugal screen within said member, means to supply threshed material containing grain to said screen, said rotary screen being adapted to discharge screened material onto said surface, means to rotate said air blast and the material on said surface to subject the material on said surface to sufficient centrifugal force to cause only the grain and other denser particles to move toward the large end of said cone against the air blast, a dividing wall extending outwardly from a point closely spaced in an axial direction with respect to the small end of the conical surface for dividing the chaff and other very light particles from unthreshed heads and other particles of intermediate density, and means for discharging over-size material which fails to pass through said screen.

7. A grain separating machine having a rotary centrifugal screen, means to supply threshed material to the inner surface of said screen, means to rotate said screen at sufficient speed to force a portion of said material through the same and discharge it radially by centrifugal force, a member having an internal approximately frusto-conical surface surrounding said screen and adapted to receive material which passes through the screen, and means to direct a uniformly distributed substantially helical air blast over all of said surface in a direction from the large to the small end of said conical surface, said air blast having a rotary component of motion sufficient to subject the material on the surface to a centrifugal force effective to move only the denser particles on said surface to the larger end thereof in opposition to the axial component of the helical air blast and having an axial component of motion sufficient to move the remaining particles on said surface to the small end of said cone, and means for discharging over-size material which fails to pass through said screen.

8. In a grain threshing and separating machine, a pair of spaced relatively rotatable threshing elements adapted to thresh material fed between them and discharge it centrifugally, a rotary screen coaxially surrounding said elements and adapted to receive threshed material discharged therefrom, said screen being adapted to prevent the passage of straw and other bulky material but to permit the passage of grain and smaller particles of material, means to rotate said screen in order to force material through the same and discharge it centrifugally therefrom, an approximately frusto-conical separating plate coaxially surrounding said rotary screen and adapted to receive material which passes through the same, means for directing a blast of air over the internal surface of said plate in a direction from the large end to the small end of the cone, and means for causing a rotation of the material on said plate to induce sufficient centrifugal force to cause only the denser particles on said plate to move toward the larger end of said cone against the air blast.

9. In a grain threshing and separating machine, a pair of spaced threshing elements, means to rotate one of said elements with respect to the other to thresh material fed between the elements and discharge it radially by centrifugal force, a screen surrounding said elements in position to receive threshed material discharged by said threshing elements, said screen being rotatable with said rotated element, a second screen surrounding said first screen and adapted to receive and further separate the material which passes through the first screen, a plurality of blades projecting radially from said second screen for the purpose of receiving screened material therefrom and impelling it radially, means for rotating said second screen and said blades at a lower speed than said threshing element and first screen, and means for directing an axial air blast in the vicinity of the outer edges of said blades to effect a centrifugal winnowing operation upon the material impelled outwardly by said blades.

10. In a centrifugal grain separator, a substantially cylindrical casing having an annular chaff receiving channel at one end, an annular grain receiving channel at its opposite end, and an intermediate annular channel said channels being coaxial and opening inwardly, a pair of axially spaced rotary screens mounted within the casing and having inner surfaces adapted to receive material to be screened, means for feeding threshed material to the inner surface of the screen adjacent said one end of the casing, means for blowing an air blast axially through the casing toward said one end thereof, means including said air blast for separating material discharged through said last mentioned screen and directing the lighter particles into said chaff channel and the heavier particles into said intermediate channel, means for conducting the material from said intermediate channel to the inner surface of the other screen, and means for directing the grain that passes through said other screen into said grain channel through said air blast.

11. In a grain separating machine, a centrifugal impeller screen structure adapted to receive threshed material and discharge the smaller particles thereof centrifugally through the screen and to discharge the remainder of said material centrifugally at a point axially spaced from the point of discharge of the screened material, a chaff pipe having an annular channel surrounding said machine in position to receive said remaining material, a separating plate of frusto-conical form coaxially surrounding said screen structure and adapted to receive screened material discharged therefrom, the smaller end of said separating plate being adjacent said chaff pipe channel, means for directing a blast of air axially over said plate toward the smaller end thereof to blow chaff and light particles into said chaff pipe channel, and means to receive grain and denser particles discharged from the large end of said frusto-conical plate by centrifugal force.

12. In a grain separating machine, a centrifugal impeller screen structure adapted to receive threshed material and discharge the smaller particles thereof centrifugally through the screen and to discharge the remainder of said material centrifugally at a point axially spaced from the point of discharge of the screened material, a chaff pipe having an annular channel surrounding said machine in position to receive said remaining material, a separating plate of frusto-conical form coaxially surrounding said screen structure and adapted to receive screened material discharged therefrom, the smaller end of said separating plate being adjacent said chaff pipe channel, means for directing a blast of air axially over said plate toward the smaller end thereof to blow chaff and light particles into said chaff pipe channel, a re-cleaning screen, and means to receive grain and denser particles discharged from the large end of said frusto-conical plate and direct them to said re-cleaning screen.

13. In a grain threshing and separating machine, means to thresh a crop and discharge the threshed material radially by centrifugal force, a centrifugal impeller screen structure adapted to receive material discharged from said threshing means and to centrifugally discharge screened material radially at one point and the remainder of the material radially at an axially spaced point, a chaff pipe having an annular channel surrounding said machine in position to receive said remaining material, a frusto-conical separating plate surrounding said screen structure and adapted to receive screened material discharged therefrom, the smaller end of said plate being adjacent said chaff pipe channel, means for directing a blast of air axially over said plate toward the smaller end thereof to blow chaff and light particles into said chaff pipe channel, a separating wall extending outwardly from a point between the chaff pipe channel and the small end of said plate and spaced slightly from the latter, means to receive unthreshed heads and other material of intermediate density which is projected radially between said plate and said dividing wall and to deliver said material back to said threshing means, and means to receive grain and denser particles discharged from the large end of said frusto-conical plate by centrifugal force.

14. A separating device including a member having an internal surface conforming approximately to a truncated cone, means including an annularly disposed air inlet in registry with the periphery of the large end of said conical surface and an annularly disposed air outlet in registry with the periphery of the small end of said conical surface to direct and maintain a uniformly distributed air blast over all of said surface with a uniform axial component of motion in a direction from the large to the small end of the cone, means to deposit unseparated material on said surface intermediate the ends thereof by an outward movement of the material from a region located within and between the ends of the cone and to rotate said air moving over said surface and the material on said surface about the axis of said cone at sufficient speed to cause only the denser particles thereof to move on said surface under the influence of centrifugal force toward the larger end of said cone against the force of the axial air blast, said axial air blast component being sufficient to carry the remaining material along the surface of the cone to the small end thereof and discharge said remaining material uniformly through said outlet.

15. A separating device including a member having an internal surface conforming approximately to a truncated cone, an annular channel located adjacent and radially outwardly of each extremity of said conical surface, means to direct and maintain a uniformly distributed air blast over all of said surface with an axial component of motion in a direction from the large to the small end of the cone, means to deposit unseparated material on said surface intermediate the ends thereof and to rotate the air moving over said surface and the material on said surface about the axis of said cone at sufficient speed to cause only the denser particles thereof to move on said surface under the influence of centrifugal force toward the larger end of said cone against the force of the axial air blast and discharge into the channel adjacent the large extremity of the conical surface, said axial air blast component being sufficient to carry the remaining material along the surface of the cone to and discharge it uniformly around the periphery of the small end thereof, an outlet opening in communication with the channel adjacent the small end of the cone, and a centrifugal fan having blades extending into said last mentioned channel radially beyond the peripheral edge of the small end of the cone for receiving air discharged from said conical surface and expelling it through said outlet opening.

16. The method of separating which includes depositing unseparated material upon an internal truncated approximately conical surface, moving the lighter components of said material along said surface to and discharging them uniformly around the periphery of the inner extremity of the truncated portion of said cone by subjecting the material to an air blast having a substantially uniform axial component of motion from the large to the small end of the cone, and simultaneously moving the denser components of said material along said surface to the large end of the cone by continuously rotating the air and all of said material on said surface about the axis of the cone at a uniform speed sufficient to induce a centrifugal force acting on said material which is sufficient in the case of the denser components of the material only to overcome the influence of the axial air blast component.

17. A separating device including a member having an internal surface conforming approximately to the internal surface of a truncated cone, means including an annularly disposed air inlet in registry with substantially the entire periphery of the large end of said conical surface and an annularly disposed air outlet in registry with substantially the entire periphery of the small end of said conical surface for directing a uniformly distributed air blast over all of said surface with a substantially uniform axial component of motion in a direction from the large to the small end of the cone, means to deposit unseparated material on said surface intermediate the ends thereof and to rotate said air moving over all said surface and all the material on said surface about the axis of said cone at a uniform speed sufficient to cause only the denser particles thereof to move on said surface under the influence of centrifugal force towards said air inlet against the force of the axial air blast, said axial component of the air blast being sufficient to carry the remaining material along the surface of the cone toward and through said air outlet.

18. A separating device including a stationary member having an internal surface conforming approximately to the internal surface of a truncated cone, means including an annular inlet opening in registry with the entire periphery of the large end of said conical surface and an annular outlet opening in registry with the entire periphery of the small end of said conical surface for directing a uniformly distributed air blast in a substantially helical path over all of said surface with an axial component of motion in a direction from the large end of the truncated cone to the small end and a rotary component of motion about the axis of the cone, means for depositing unseparated material on said surface intermediate the ends thereof with an initial rotary motion equal to said rotary component of motion of the air blast, said axial and rotary components of motion of the air blast being so related at all points on said surface as to cause material of one density to move outwardly on said surface to the large extremity of the cone under the influence of centrifugal force and to cause material of less density to move inwardly on said surface toward the small extremity of the cone and discharge uniformly through said outlet under the influence of the axial component of the air blast.

19. A separating device including a stationary member having an internal surface conforming approximately to the internal surface of a truncated cone, means including an annular inlet opening in registry with the entire periphery of the large end of said conical surface and an annular outlet opening in registry with the entire periphery of the small end of said conical surface for directing a uniformly distributed air blast in a substantially helical path over all of said surface with a uniform axial component of motion in a direction from the large end of the truncated cone to the small end and a rotary component of motion about the axis of the cone, means for depositing unseparated material on said surface intermediate the ends thereof with an initial rotary motion equal to said rotary component of motion of the air blast, said axial and rotary components of motion of the air blast being so related at all points on said surface as to cause material of one density to move outwardly on said surface to the large extremity of the cone under the influence of centrifugal force and to cause material of less density to move inwardly on said surface toward the small extremity of the cone and discharge uniformly through said annular outlet under the influence of the axial component of the air blast, and means to adjust the axial component of the air blast with respect to its rotary component.

20. A separating device including a stationary member having an internal approximately truncated conical surface, a rotary member journaled coaxially within said surface and provided with a plurality of blades the outer edges of which are positioned in close proximity to said surface over substantially the entire extent of said surface, means for supplying unseparated material to said surface in a radial direction outwardly between said blades, and means including an annular air inlet opening in registry with the entire periphery of the large end of said conical surface and an annular air outlet opening in registry with the entire periphery of the small end of said conical surface for directing a uniformly distributed air blast over all of said surface with an axial component of motion in a direction from the large to the small end of the cone, and means for rotating said member to cause said blades to maintain the air in the vicinity of said surface and the material on said surface rotating at a uniform angular velocity sufficient to cause only the denser particles of said material to move on said surface toward the large end of the conical surface under the influence of centrifugal force against the force of the axial component of motion of said air blast.

21. In a grain separating device, a member having an internal surface conforming approximately to the internal surface of a truncated cone, means including an annular air inlet opening in registry with the entire periphery of the large end of said conical surface and an annular outlet opening in registry with the entire periphery of the small end of said conical surface for directing a uniformly distributed air blast over all of said surface with an axial component of motion in a direction toward the small end of the cone, means to supply threshed material containing grain to said surface, means to rotate said air blast and the material on said surface about the axis of said cone to subject the material on said surface to sufficient centrifugal force to cause only the grain and other denser particles to move on said surface toward the large end of the cone against the air blast while permitting the lighter particles including chaff and unthreshed heads to move on the surface of the cone toward the small end thereof and discharge through said outlet under the influence of the axial air blast, and a radially extending dividing wall having its innermost edge closely spaced in an axial direction with respect to the small end of the conical surface for dividing the chaff and other very light particles from unthreshed heads and other particles of intermediate density discharged through said outlet by the axial component of said air blast.

22. A separating device including a member having an internal surface conforming approximately to the internal surface of a truncated cone, means including an annularly disposed air inlet in registry with substantially the entire periphery of the large end of said conical surface and an annularly disposed air outlet in registry with substantially the entire periphery of the small end of said conical surface for directing a uniformly distributed air blast over all of said surface with an axial component of motion in a direction from the large to the small end of the cone, means to deposit unseparated material on said surface intermediate the ends thereof and to rotate said air moving over all said surface and all the material on said surface about the axis of said cone at a uniform speed sufficient to cause only the denser particles thereof to move on said surface under the influence of centrifugal force towards said air inlet against the force of the axial air blast, said axial component of the air blast being sufficient to carry the remaining material along the surface of the cone toward and through said air outlet.

23. The method of separating grain from a threshed cereal crop which includes the steps of screening the threshed crop to remove the bulk of the straw, depositing the material which passes through the screen upon an internal truncated approximately conical surface by a movement in a radially outward spiral path whose axis is that of the conical surface, moving the chaff and lighter components of said material along said surface to and discharging them uniformly around the periphery of the inner extremity of the truncated portion of said cone by subjecting said material to an air blast having a uniform axial component of motion from the large to the small end of the cone, and simultaneously moving the grain along said surface to the large end of the cone by continuously rotating the air and all of said material on said surface about the axis of the cone at a uniform speed sufficient to induce a centrifugal force acting on said material which is sufficient in the case of the grain particles to overcome the influence of the axial air blast component.

24. In a grain separating machine, an annular impeller screen structure, means for centrifugally impelling threshed material through said screen structure, a separating member having a frusto-conical internal surface spaced from said screen structure at the peripheral limits thereof, means for producing an annular jet of air at high velocity over said surface toward the small end of the cone, said impeller screen structure being adapted to rotate screened material on said surface at sufficient speed to enable only the denser particles of said material to move against the air jet in response to centrifugal force.

EDGAR E. METCALF.